(12) United States Patent
Leboeuf

(10) Patent No.: US 12,506,391 B2
(45) Date of Patent: Dec. 23, 2025

(54) SYNCHRONOUS ELECTRICAL MACHINE AND BOAT COMPRISING SUCH A MACHINE

(71) Applicant: GE ENERGY POWER CONVERSION TECHNOLOGY LIMITED, Warwicksire (GB)

(72) Inventor: Nicolas Leboeuf, Champigneulles (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 285 days.

(21) Appl. No.: 18/319,654

(22) Filed: May 18, 2023

(65) Prior Publication Data

US 2023/0378859 A1 Nov. 23, 2023

(51) Int. Cl.
- *H02P 1/46* (2006.01)
- *H02K 1/18* (2006.01)
- *H02K 1/20* (2006.01)
- *H02K 13/00* (2006.01)
- *H02K 19/10* (2006.01)

(52) U.S. Cl.
CPC ............ *H02K 19/10* (2013.01); *H02K 1/185* (2013.01); *H02K 1/20* (2013.01); *H02K 13/003* (2013.01); *H02K 13/006* (2013.01)

(58) Field of Classification Search
CPC ..... H02P 2207/05; H02P 25/022; H02P 25/03
See application file for complete search history.

(56) References Cited

U.S. PATENT DOCUMENTS

| | | | |
|---|---|---|---|
| 10,756,606 B2 | 8/2020 | Galmiche et al. | |
| 2003/0094876 A1* | 5/2003 | Hsu | H02K 15/066 310/185 |

FOREIGN PATENT DOCUMENTS

| | | |
|---|---|---|
| CN | 203056806 U | 7/2013 |
| CN | 107332416 A | 11/2017 |
| CN | 110336437 A | 10/2019 |
| CN | 210111818 U | 2/2020 |
| CN | 211239465 U | 8/2020 |
| CN | 213425957 U | 6/2021 |
| DE | 1070284 B | 12/1959 |

(Continued)

OTHER PUBLICATIONS

European Search Report for EP Application No. 22174105.1 dated Nov. 7, 2022, 8 pages.

(Continued)

*Primary Examiner* — Karen Masih
(74) *Attorney, Agent, or Firm* — Wood IP Law, LLC; Theodore A. Wood

(57) ABSTRACT

Provided is a synchronous electrical machine that includes a stator and a wounded rotor, the stator having a plurality of phases, each phase comprising coils connected together and magnetic stator poles cores fixed on a stator frame and evenly distributed along a stator diameter, each coil being wounded around a different magnetic stator pole core to form a magnetic stator pole, each phase comprising a same number of magnetic stator poles, the magnetic stator poles of each phase being disposed in the stator frame to form a concentric winding stator. The rotor includes a plurality of magnetic rotor pole cores evenly distributed around the rotor and rotor coils, each rotor coil being wounded around a different magnetic rotor pole core to form a magnetic rotor pole.

14 Claims, 11 Drawing Sheets

(56) References Cited

FOREIGN PATENT DOCUMENTS

Figure 1:
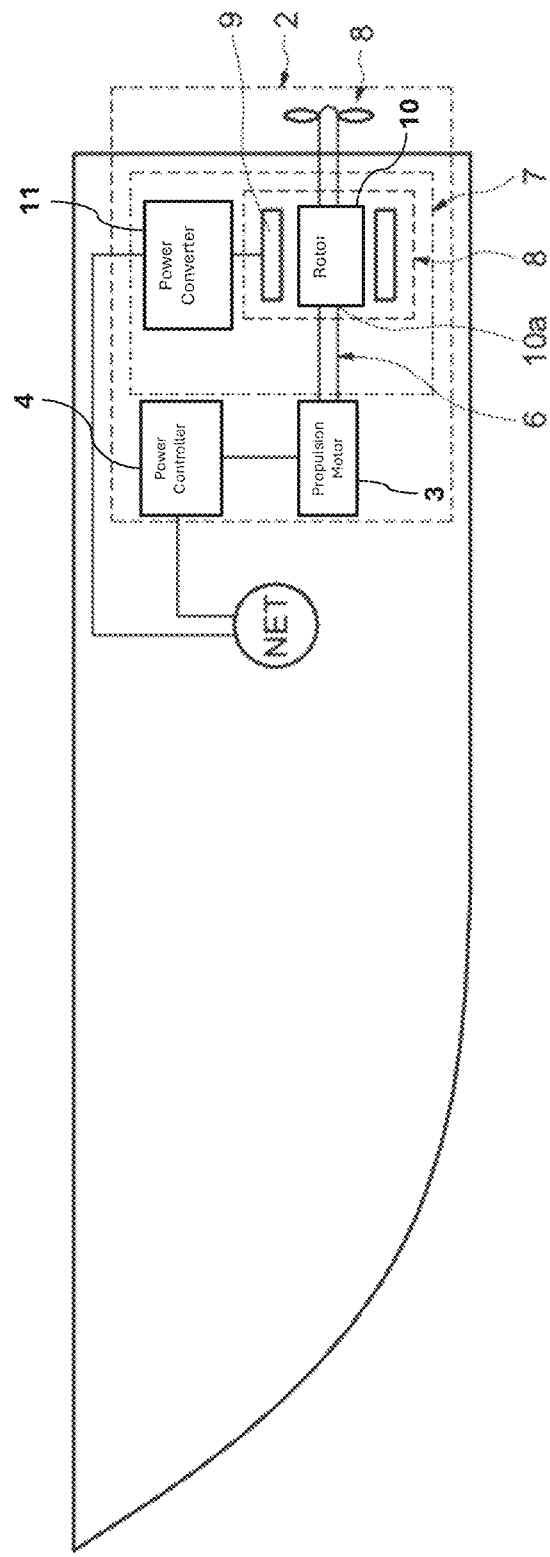

| EP | 2879280 A1 | 6/2015 | | |
|---|---|---|---|---|
| EP | 1315268 A1 | 10/2019 | | |
| EP | 3771073 A1 | 1/2021 | | |
| EP | 3145042 B1 | 3/2021 | | |
| EP | 3975386 A1 | 3/2022 | | |
| ES | 2728475 T3 | 3/1982 | | |
| JP | S50156702 U | 12/1975 | | |
| JP | S5741479 U | 3/1982 | | |
| KR | 101971854 B1 | 4/2019 | | |
| KR | 102314973 B1 | 10/2021 | | |
| PL | 3145042 T3 | 10/2021 | | |
| WO | WO-2007024184 A1 | * | 3/2007 | ............... H02K 1/02 |
| WO | 2007112647 A1 | 10/2007 | | |

OTHER PUBLICATIONS

El Refaie "Fractional-Slot Concentrated-Windings Synchronous Permanent Magnet Machines: Opportunities and Challenges," IEEE Transactions on Industrial Electronics, vol. 57, No. 1, Jan. 2010. (Abstract Only).

Fornasiero et al. "Considerations on selecting fractional-slot windings," IEEE Transactions on Industrial Applications, vol. 49, No. 3, May/Jun. 2013. (Abstract Only).

Magnussen et al. "Parasitic Effects in PM Machines with Concentrated Windings," IEEE Transactions on Industrial Applications, vol. 43, No. 5, Oct. 2007. (Abstract Only).

Mouty "Conception de machines à aimants permanents à haute densité de couple pour les éoliennes de forte puissances," 30 mai 2013, Université de Franche Comté. (Design of high torque density permanent magnet machines for high power wind turbines—English Abstract Only).

* cited by examiner

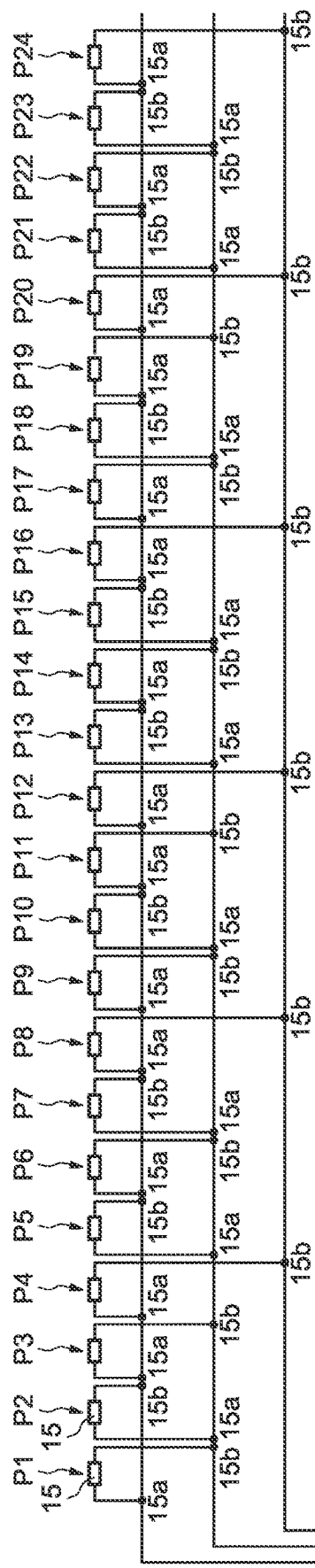
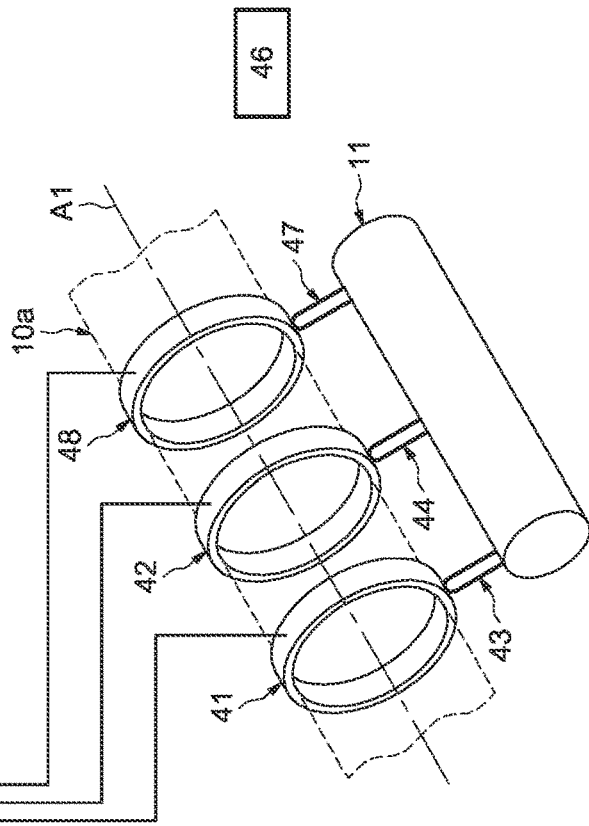
FIG.12

SYNCHRONOUS ELECTRICAL MACHINE AND BOAT COMPRISING SUCH A MACHINE

I. CROSS-REFERENCE TO RELATED APPLICATIONS

This application claims priority to European Patent Application Serial Number 22174105.1, filed May 18, 2022, which is herein incorporated by reference.

II. FIELD OF INVENTION

The present invention concerns electrical rotating machines and relates more particularly to a synchronous electrical machine comprising a wounded rotor.

The present invention also relates to a boat comprising such a synchronous electrical machine.

III. BACKGROUND

In this description, "boat" shall mean any type of motorized floating vessel or vehicle designed to be sailed.

A boat may comprise a main electrical propulsion system comprising a diesel engine, electrical generators supplying board network and electrical motors for propulsion. Additional electrical machines are also used between the main electrical motor for propulsion and the propeller to add propulsive power to the turbine and/or to add electrical power to the network. The additional electrical machines may reach up to 10 MW at 50-100 rpm.

The additional electrical machines are generally synchronous machines made of either permanent magnet rotors or wounded rotors.

As the additional electrical machines are implemented in the boat, the space reserved for each machine is limited and torque mass ratio of each machine is an important point as well as reliability, continuity of service and efficiency.

Transporting, manufacturing, assembling or repairing a permanent magnet rotor can be very complex and requires non-magnetic tools.

Further, due to the permanent magnets of the rotor, the assembly of the rotor in the stator of the synchronous electrical machine requires specific assembly procedures which are time costly.

Such machines mostly implement an axial cooling to cool the stators. A cooling fluid is passing only between adjacent coils of the stators generating hotspots in the stators and limiting therefore the torque density.

It is known that wounded rotor synchronous machines are less performant than permanent magnet synchronous machines. Wounded rotor synchronous machines generate higher thermal losses due to the current circulating in the rotor winding. It is therefore proposed to remedy the disadvantages related to synchronous electrical machines according to the prior art.

IV. SUMMARY OF INVENTION

In view of the foregoing the invention proposes a synchronous electrical machine comprising a stator and a wounded rotor, the stator comprising a plurality of phases, each phase comprising coils connected together and magnetic stator poles cores fixed on a stator frame and evenly distributed along a stator diameter, each coil being wounded around a different magnetic stator pole core to form a magnetic stator pole, each phase comprising a same number of magnetic stator poles, the magnetic stator poles of each phase being disposed in the stator frame to form a concentric winding stator.

The rotor comprises a plurality of magnetic rotor pole cores evenly distributed around the rotor and rotor coils, each rotor coil being wounded around a different magnetic rotor pole core to form a magnetic rotor pole.

Advantageously, the magnetic stator pole cores are fixed on the stator frame with first removable fasting means and the magnetic rotor pole cores are fixed on a rotor shaft with second removable fasting means.

Preferably, the first removable fasting means comprise first screws passing through holes evenly disposed on a longitudinal direction of the stator frame and tapered retaining means incorporated in each magnetic stator pole core, the first screws being engaged in the tapered retaining means, and the second removable fasting means comprising second screws passing through holes evenly disposed on a longitudinal direction of the magnetic rotor pole core, the rotor shaft comprising tapered holes in which the second screws are engaged.

Advantageously, a non-magnetic shim can be interposed between each magnetic stator poles and the stator frame.

The non-magnetic shim avoids Eddy-induced losses in the frame.

Preferably, each magnetic stator pole core extending in a longitudinal direction of the stator comprises at least one cooling groove on a surface of the said magnetic stator pole core in contact with the stator frame and extending along the longitudinal direction so that the groove and the contact surface of the stator frame form a cooling channel.

The cooling channel improves the cooling of the machine and also permits to reduce Eddy-currents losses induced in the frame.

Advantageously, each magnetic stator pole core comprises a plurality of magnetic elements, two adjacent magnetic elements being separated by an air gap forming a radial cooling duct.

Preferably, the stator frame comprises openings on the lateral surface of the stator frame so that a cooling fluid circulating in cooling ducts escapes from the stator through the openings.

Advantageously, the stator frame comprises an opening at each of end so that a cooling fluid circulating in cooling ducts escapes from the stator through the openings.

Advantageously, each magnetic stator pole core comprises at least one tie rod and one end plate at each end of the magnetic stator pole core, the tie rods passing through the magnetic stator pole cores to connect the two end plates fixed on the stator frame.

Preferably, tierods and end plates are made of non-magnetic steel to avoid additional losses.

Tierods's numbers and shapes can be optimized to maximise mechanical stiffness of the whole pole as well as magnetic reluctant circuit.

Advantageously, the wounded rotor is lodged in the stator or the stator is lodged in the wounded rotor.

Preferably, the rotor comprises commutation means configured to supply all of the rotor coils or a part of the rotor coils to vary the rotation speed of the rotor when the coils of the stator are supplied with a supply signal having a constant predetermined frequency.

Advantageously, the rotor comprises a first slip ring and a second slip ring having each a different electric potential, the stator comprising two brushes, each brush cooperating with a different slip ring to supply the commutation means.

Preferably, the rotor comprises three slips and the stator comprises three brushes, each brush cooperating with a different slip ring, each slip ring having a different electric potential, a first set of rotor coils being supplied with a first and a second slip rings, and a second set of rotor coils being supplied with the first and the third slip rings, the second set of rotor coils forming compensation poles, the sum of the first and second set of coils being equal to the number of rotor coils.

Another object of the invention relates to a boat comprising a synchronous electrical machine as defined above.

V. BRIEF DESCRIPTION OF THE DRAWINGS

Figure 2:
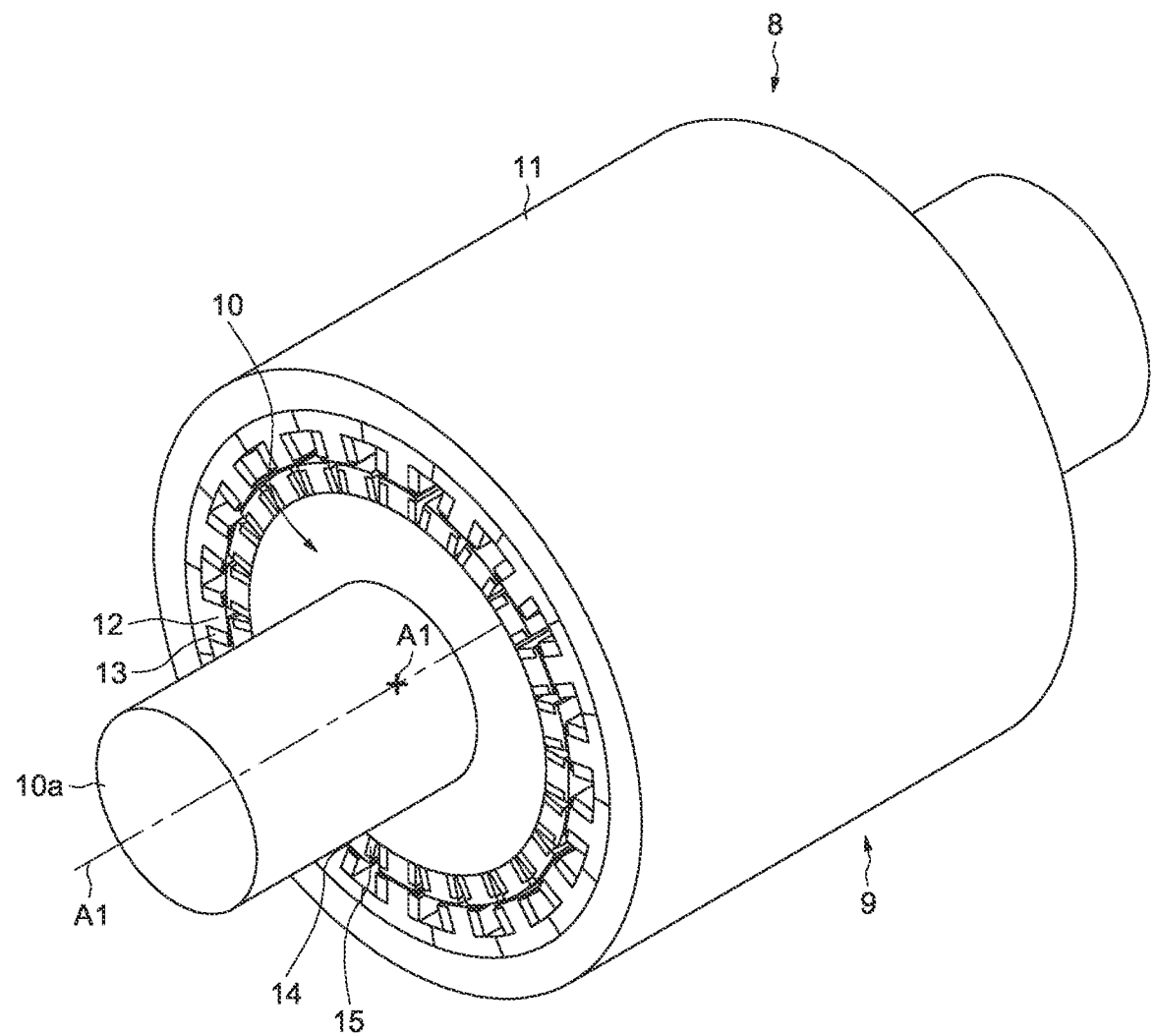
Figure 3:
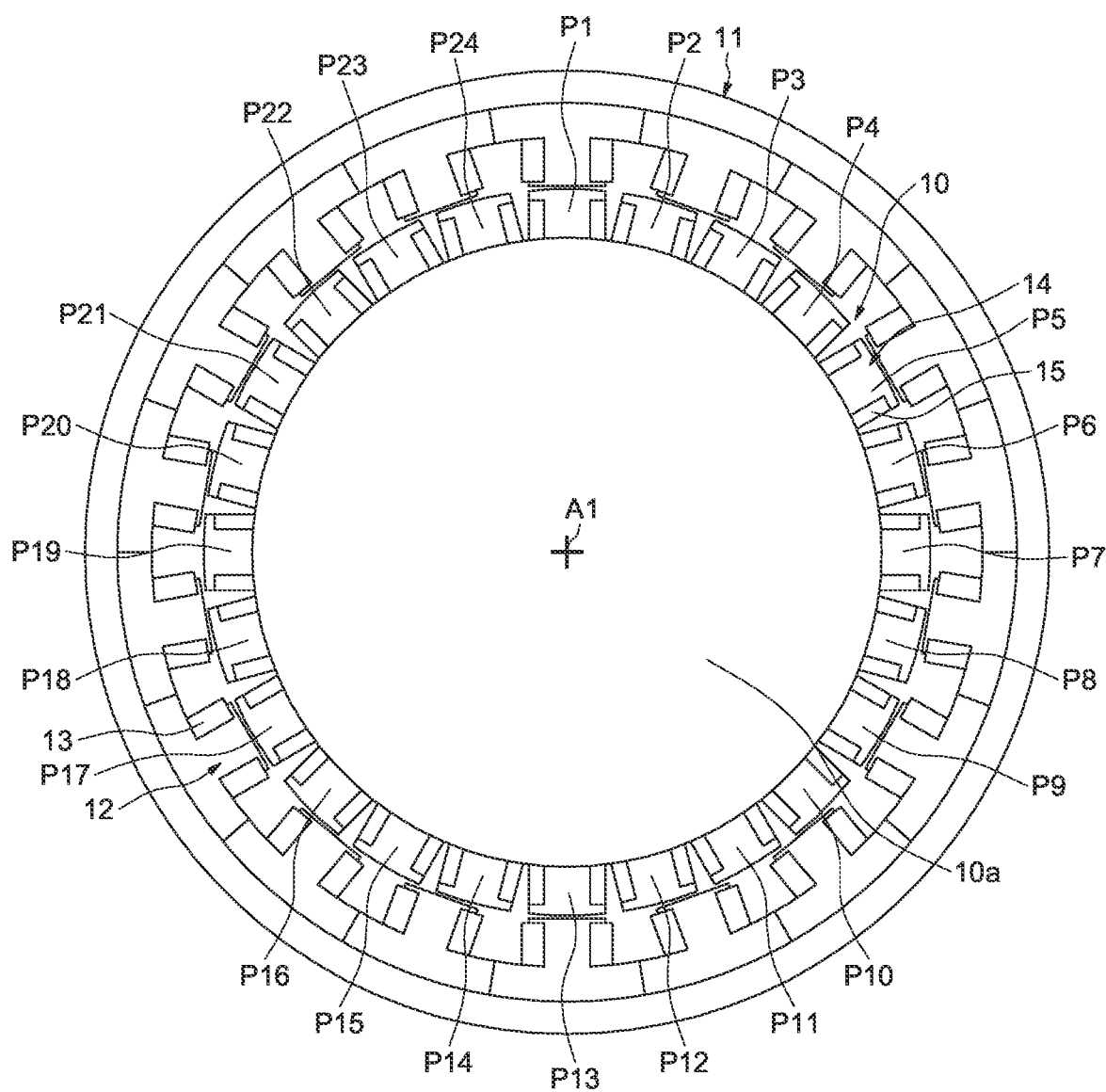
Figure 4:
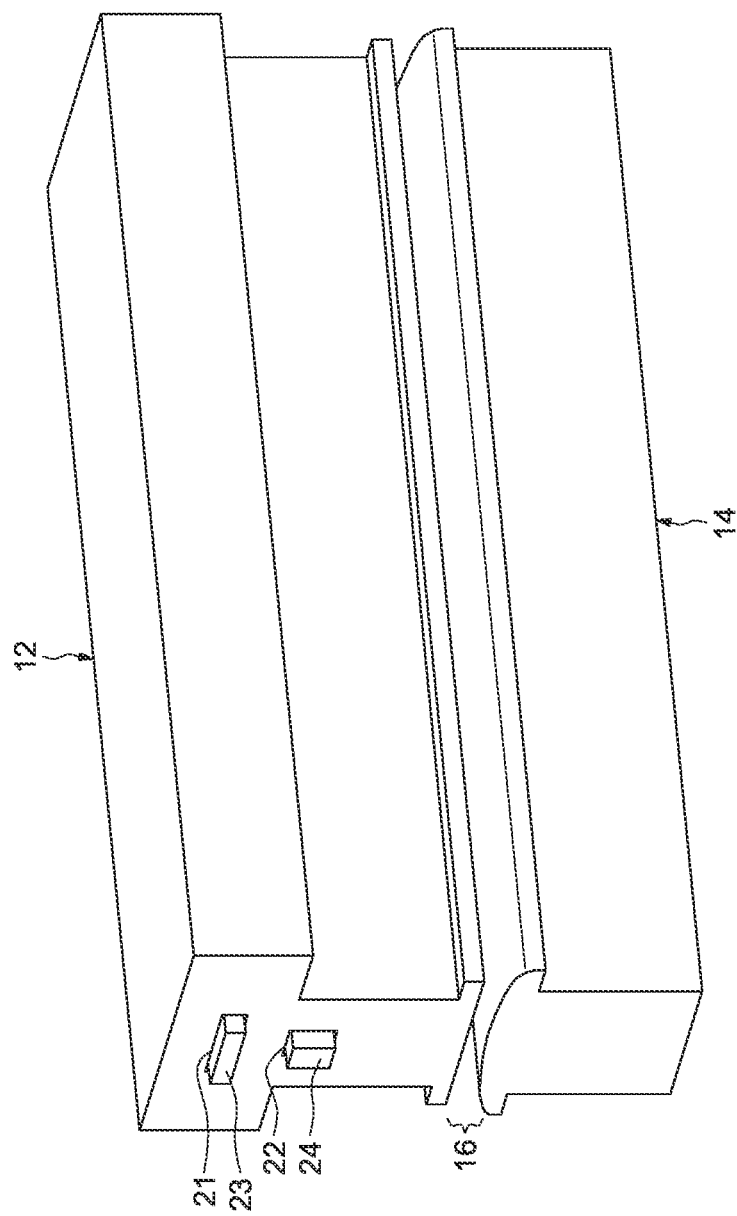
Figure 5:
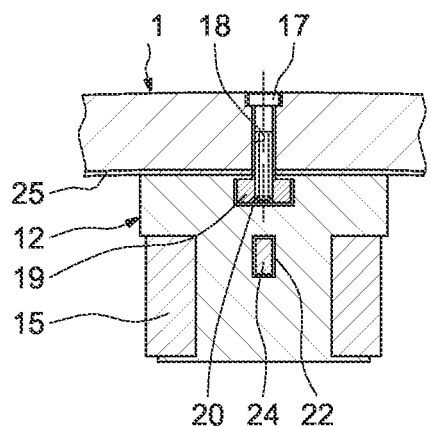
Figure 6:
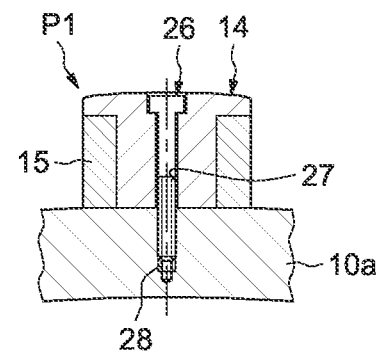
Figure 7:
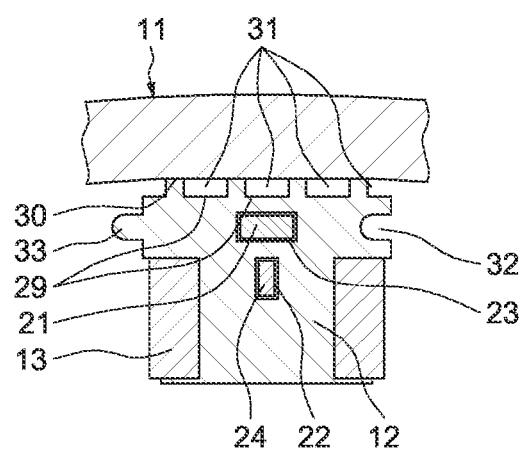
Figure 8:
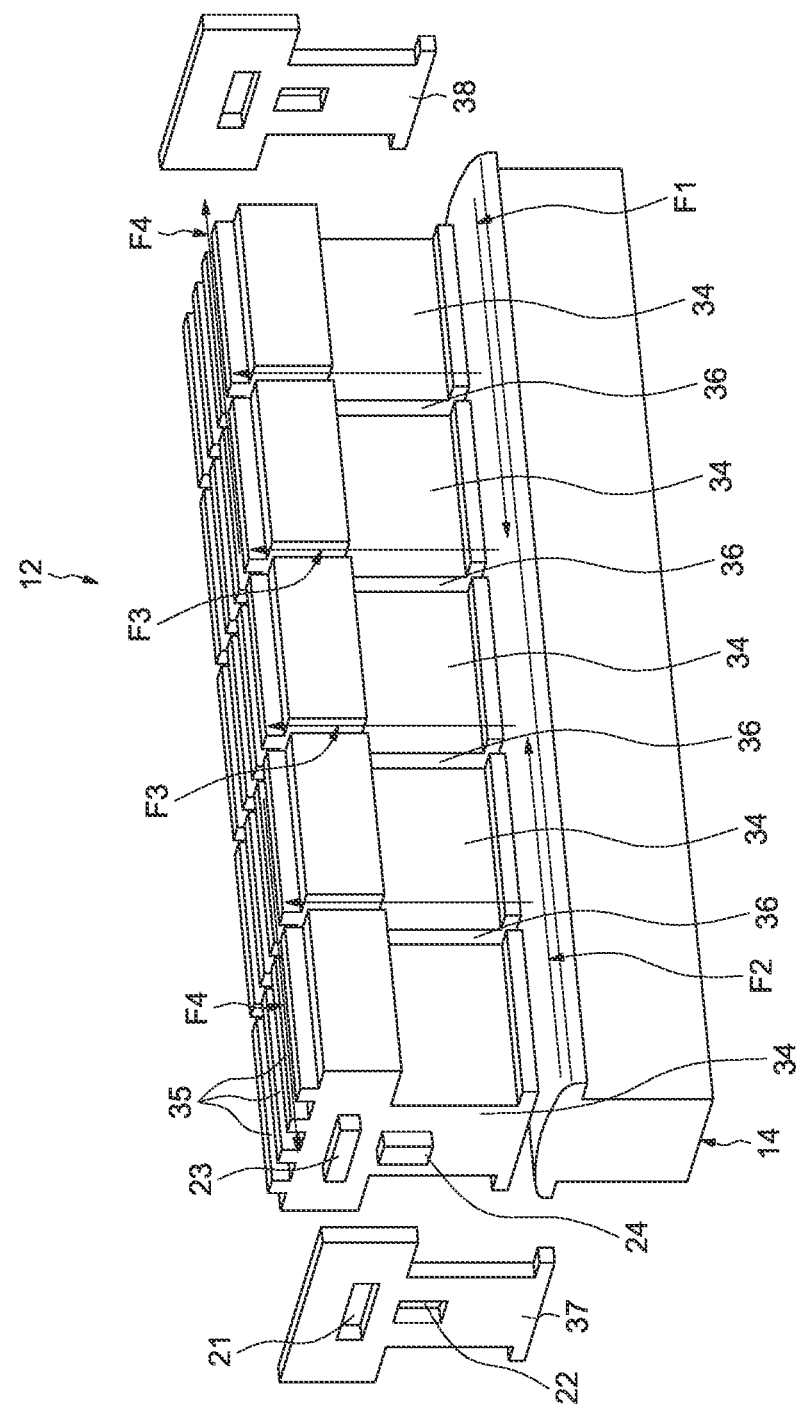
Figure 9:
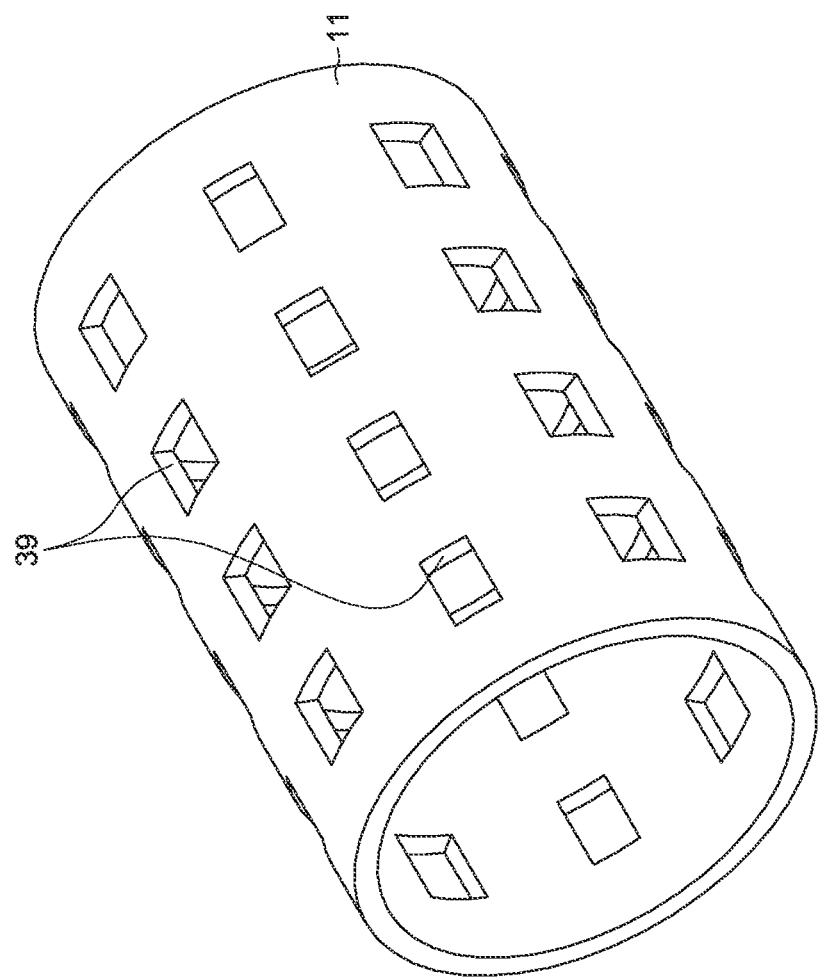
Figure 10:
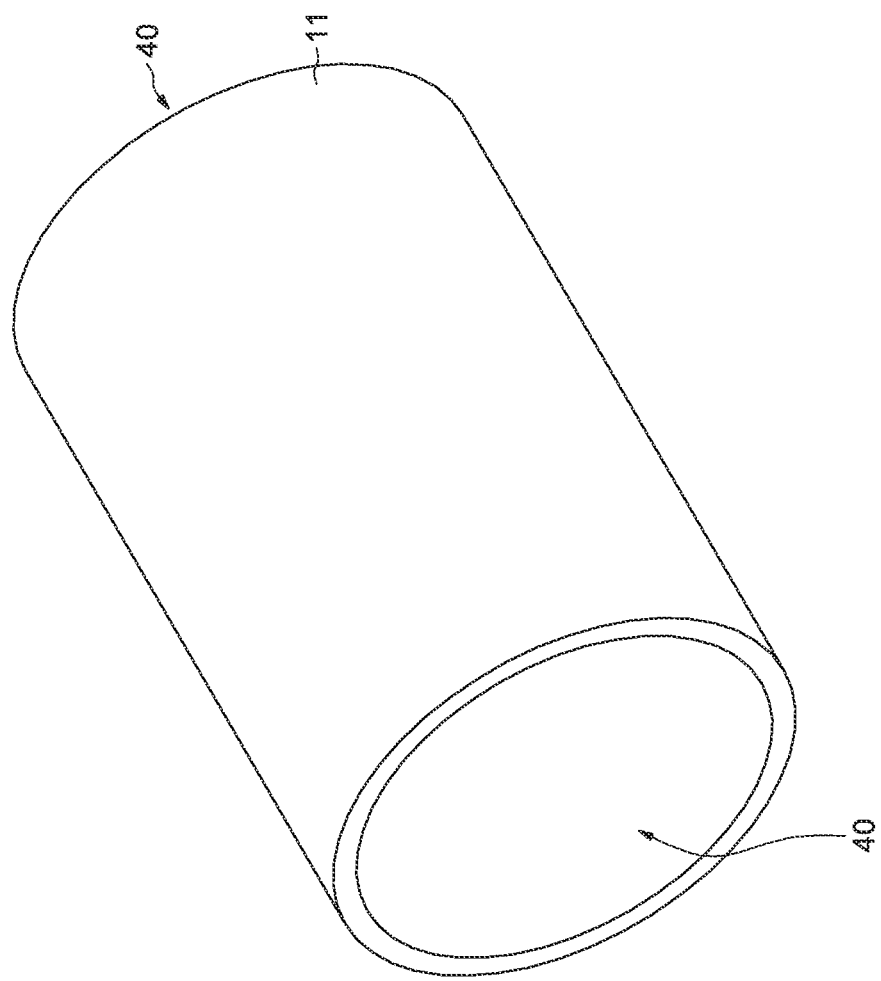
Figure 11:
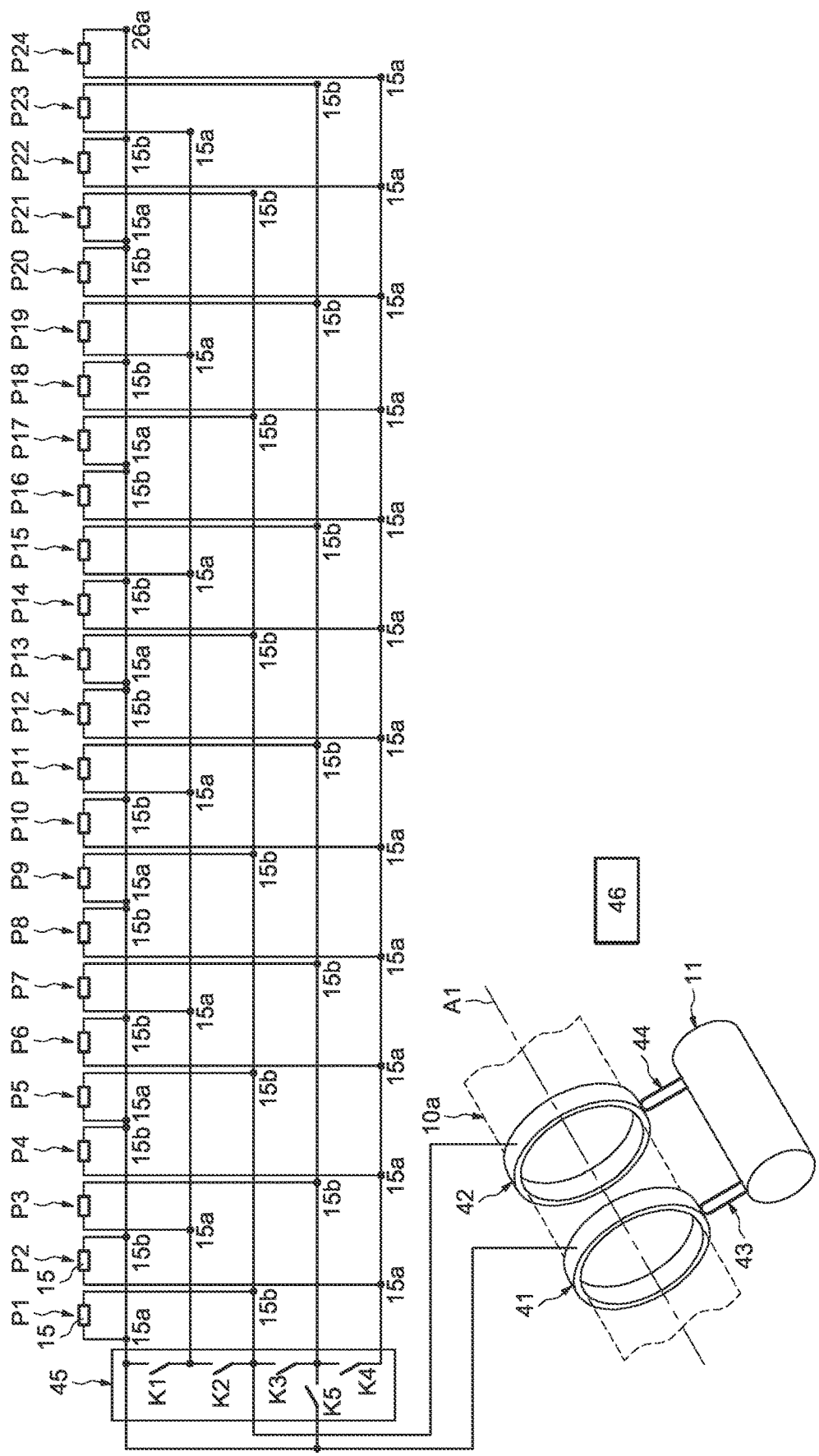
Figure 13:
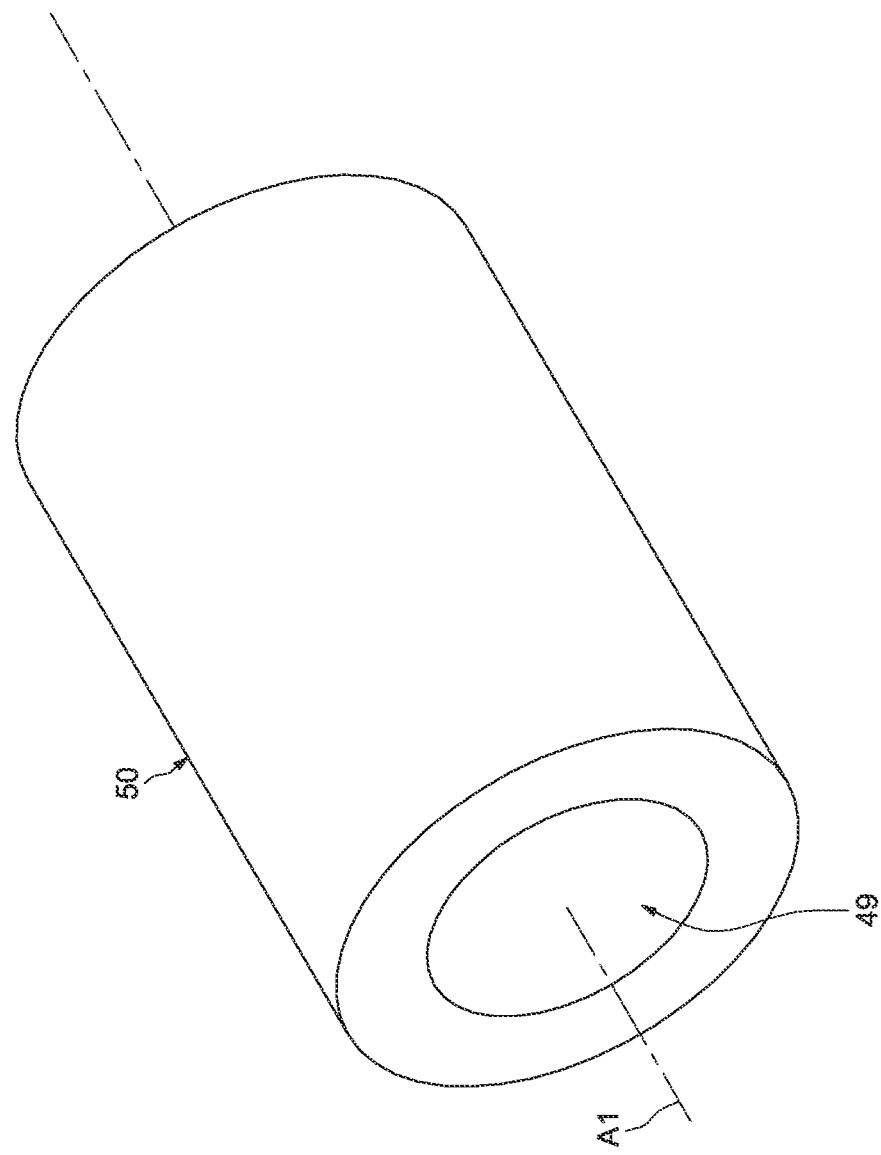

Other characteristics and advantages of the invention will emerge on reading the following description of embodiments of the invention, provided solely by way of non-limiting examples and with reference to the drawings in which:

FIG. 1 illustrates an example of a boat according to the invention,

FIGS. 2, 3 and 4 illustrate an example of a synchronous electrical machine according to the invention, FIG. 5 illustrates an example of a part of a stator of the synchronous electrical machine according to the invention, FIG. 6 illustrates an example of a part of a rotor of the synchronous electrical machine according to the invention, FIG. 7 illustrates another example of a part of a stator of the synchronous electrical machine according to the invention, FIG. 8 illustrates a third example of a part of a stator of the synchronous electrical machine according to the invention, FIG. 9 illustrates an example of a stator frame of the synchronous electrical machine according to the invention, FIG. 10 illustrates another example of a stator frame of the synchronous electrical machine according to the invention, FIG. 11 illustrates a first example of an electrical circuit of the rotor according to the invention, FIG. 12 illustrates a second example of an electrical circuit of the rotor according to the invention, and FIG. 13 illustrates another example of a synchronous electrical machine according to the invention where rotor and stator are reversed.

VI. DETAILED DESCRIPTION OF THE INVENTION

FIG. 1 illustrates an example of a boat 1 comprising a propulsion unit 2 for propelling the boat 1, a power supply network NET supplying the propulsion unit 2, with electrical power.

The propulsion unit 2 comprises a propulsion motor 3, a power converter 4 and a propeller 5 driven by the propulsion motor 3 through a shaft 6.

The power controller 4 supplies the propulsion motor 3 from the power supply network NET delivering an alternative voltage.

The propulsion unit 2 further comprises a booster unit 7.

The booster unit 7 comprises a synchronous electrical machine 8 comprising a stator 9 and a rotor 10 comprising a rotor shaft 10a, the rotor shaft 10a being connected at each end to the shaft 6 between the propulsion motor 3 and the propeller 3, and a reversible power converter 11 to supply the synchronous electrical machine 8.

The synchronous electrical machine 8 operates in a motor mode or in a generator mode.

In the motor mode, the synchronous electrical machine 8 supplied by the reversible power converter 11 generates a torque on the shaft 6 to assist the propulsion motor 3.

In the generator mode, the rotor 10 is driven by the shaft 6 so that the synchronous electrical machine 8 generates electrical energy supplying the reversible power converter 11.

The power converter 11 supplies for example the power supply network NET with the electrical energy power generated by the synchronous electrical machine 8 in generator mode.

The boat 1 may comprise more than one network NET.

The power converters 4 and 11 are made from semiconductors, for example diodes, thyristors or piloted interrupters.

FIGS. 2 and 3 illustrate a view and a radial cross section of an example of the synchronous electrical machine 8.

The stator 9 comprising a stator frame 11, magnetic stator pole cores 12 fixed on the stator frame 19 and extending along a longitudinal direction of the stator, and coils 13.

The magnetic stator pole cores 12 are favourably evenly distributed along a stator diameter.

Each coil 13 is wounded around a different magnetic stator pole core 12 having approximatively a length equal to the length of the stator 9.

Each magnetic stator pole core 12 and coil 13 wounded around the said stator pole core 13 form a magnetic stator pole.

The stator 9 comprises for example eighteen magnetic stator poles.

The coils 13 are disposed in the stator frame 9 and connected together to form a plurality of phases each phase comprising a same number of magnetic stator poles.

For example, the stator 9 comprises three phases, each phase comprising six stator magnetic poles.

The magnetic stator poles of each phase are disposed in the stator frame 9 to form a concentric winding stator.

The concentric winding stator reduces the Joule losses comparing to a distributed winding stator due to the fact their coil's head is shorter.

Moreover, the machine 8 has a higher torque density compared to synchronous machines comprising a distributed winding stator.

The rotor 10 comprises a plurality of magnetic rotor pole cores 14 evenly distributed around the rotor 10 and fixed on the rotor shaft 10a, and rotor coils 15.

Each rotor coil 15 is wounded around a different magnetic rotor pole core 14 forming a magnetic rotor pole, the poles of the rotor being identical.

The rotor 10 is lodged in the stator 9 and rotates around a central axis A1.

In another embodiment, the stator 9 is lodged in the rotor 10.

In this example, it is assumed that the rotor 10 comprises twenty-four magnetic rotor poles P1 to P24.

The rotor poles P1 to P24 are disposed in the rotor 10 so that the rotor pole Pn+1 is between the rotor pole Pn et Pn+2, n being an integer between 1 and 22, the rotor poles P1 and P24 being adjacent.

The rotor 10 further comprises a first slip ring and a second slip ring (not represented) cooperating with two brushes (not represented) of the stator 9, each brush cooperating with a different slip ring to supply the rotor coils 15 as explained in the following.

The reversible power converter 11 supplies the stator 9 and the rotor 10 of the machine 8 respectively with alternative voltage and continuous voltage.

In another embodiment, the booster unit 7 comprises a continuous voltage source to supply the rotor 10 and alternative voltage source to supply the stator 9, both sources being independent.

The rotor coils 15 are supplied through the brushes and the slip rings.

Alternatively, the slip rings may be supplied with an exciter.

FIG. 4 illustrates a view of a first example of the magnetic stator pole core 12 and an example of the magnetic rotor pole core 14 defining an air gap 16 of the machine 8.

The shape of the magnetic rotor pole core 14 can be adjusted to limit air gap flux density harmonics and their consequences on vibration, noise and losses.

The magnetic stator core 12 and magnetic rotor pole core 14 are made for example of magnetic laminations to reduce Eddy-currents losses in the pole cores.

The magnetic stator core 12 further comprises two holes 21, 22 extending in the longitudinal direction.

The two holes 21, 22 have different shapes designed to optimize the magnetic flux circulating in the core 12.

Each hole 21, 22 lodges a tie rod 23, 24 to maintain compacted the magnetic laminations of the core 12.

Preferably, the tie rods 23, 24 are made of non-magnetic steel to avoid Eddy-current losses in the frame 11.

FIG. 5 illustrates a radial cross section of a part of the stator 9 comprising the first example of the magnetic stator pole core 12 illustrates at FIG. 4 and a rotor coil 15.

The magnetic stator pole core 12 is fixed on the stator frame 11 with first removable fasting means so that the magnetic stator pole core 12 is in contact with the frame 11.

The first removable fasting means permit to easily assemble and disassemble the stator pole comprising the magnetic stator pole core 12 and the coil 15, for example when the coil 15 is in fault.

The first removable fasting means may comprise first screws 17 passing through holes 18 evenly disposed on a longitudinal direction of the stator frame 11 and tapered retaining means incorporated in the stator magnetic pole core 12.

The passing through holes 18 and the retaining means are arranged in the stator 9 so that each first screw 17 is engaged in tapered retaining means to fix the magnetic stator pole core 12 on the stator frame 11.

The tapered retaining means comprise for example nuts 19 arranged in a fixing groove 20 of the stator magnetic pole core 12.

A non-magnetic shim 25 may be interposed between the magnetic stator pole core 12 and the stator frame 11 to reduce Eddy-currents losses in the frame 11 in order to limit warming of the stator 9.

The non-magnetic shim 25 is for example made of laminate material or stainless steel if thermal exchange with frame is needed.

FIG. 6 illustrates a radial cross section of a part of the rotor 10 comprising an example of the magnetic rotor pole P1 comprising the magnetic rotor pole core 14 and the rotor coil 15.

The rotor magnetic pole core 14 is fixed on the rotor shaft 10a with second removable fasting means so that the rotor magnetic core 14 is in contact with the rotor shaft 25.

The second removable fasting means permits to easily assemble and disassemble the rotor set comprising the magnetic rotor pole core 14 and the associated rotor coil 15, for example when the rotor coil 15 is in fault.

As the rotor 10 is wounded and does not comprise permanent magnets, manufacturing and repairing the rotor 10 do not require non-magnetic tools compared to permanent magnets rotors.

Further the assembling of the rotor in the stator is easier as well as transportation.

The second removable fasting means may comprise second screws 26 passing through holes 27 evenly disposed on a longitudinal direction of the magnetic rotor pole core 14, and tapered holes 28 disposed in the rotor shaft 10a and arranged in the rotor shaft 10a so that each second screw 26 is engaged in a different tapered hole 28.

The rotor poles P1 to P24 are modular poles easy to arrange on a pre-existing rotor shaft design.

Their shapes, including the face in the air gap, can be optimized to maximise performances. Assembling can also be done using dove tails and keys bars.

FIG. 7 illustrates a radial cross section of a part of the stator 9 comprising a second example of the magnetic stator pole core 12.

The stator pole core 12 comprises three cooling grooves 29 on the surface 30 of the stator pole core 12 in contact with the stator frame 11.

The stator pole core 12 may comprise more than three cooling grooves 29.

The cooling grooves 29 extend along the longitudinal direction of the stator 9 so that the cooling grooves 29 and the surface of the stator frame 11 in contact with the surface 30 of the stator pole core 12 form cooling channels 31.

The cooling channels 31 and a cooling fluid flowing in the channels may form a bilateral cooling scheme.

The stator 9 further comprises one end plate at each end of the magnetic stator pole core 12 fixed on the stator frame 11 and connected by the tie rods 21, 24.

The tie rods 21, 24 engaged in the end plates fix the stator pole cores 12 in the frame 11 with or without obstructing the cooling channels 34 if an open or closed frame is used as shown in the following on FIGS. 9 and 10.

The stator pole core 12 further comprises on a first circumferential side a groove 32 and on the second circumferential side a lug 33 so that the lug 33 of a first stator pole core is engaged in the groove 32 of the second stator pole core to maintain the stator pole core 12 in the stator 9.

The first example of the magnetic stator pole core 12 illustrated in FIG. 5 may also be provided with the groove 32 and the lug 33.

FIG. 8 illustrates a view of a third example of the magnetic stator pole core 12 and the example of the magnetic rotor pole core 14.

The magnetic stator pole core 12 comprises a plurality of magnetic elements 34 arranged according to the longitudinal direction of the stator 9 and having a radial section identical to the radial section of the second example of the magnetic stator pole core 12 illustrated on FIG. 7.

Each element 34 comprises cooling grooves 35 cooperating with the stator frame 11 to define cooling channels as explain above.

Each magnetic element 34 comprises for example a stack of magnetic laminations.

Two adjacent magnetic elements 34 are separated by an air gap forming a radial cooling duct 36.

The magnetic elements 34 are fixed in the stator 9 by the tie rods 23, 24 passing through the magnetic elements 34 and connected to end plates 37, 38 of the stator pole core 12.

Spacers or pins may be inserted between two adjacent magnetic elements 34 to from the radial cooling duct 36.

The longitudinal length of the magnetic element 34 and the radial cooling duct 36 are determined so that the length of the plurality of magnetic element 34 and ducts 36 is equal to the length of the stator 9.

Cooling fluid flows in the air gap defined between the magnetic rotor pole core 14 and the magnetic elements 34 at each end of the stator pole core 12 as represented by arrows F1, F2, flows in the air ducts 36 (arrows F3), and escapes the stator 9 by flowing in the cooling channels (arrows F4) defined by the cooling grooves 35 and the stator frame 11.

As the cooling fluid flows in the pole core 12, the exchange surface between the stator pole core 12 comprising the radial cooling ducts 36 is increased so that the cooling of the stator set is enhanced and the torque density is significantly increased.

In this way, a bilateral cooling may be obtained. As the size of the machine 8 is closely related to the cooling design capacity, bilateral cooling described before allows to reach much higher torque density compared to a machine known of the prior art.

FIG. 9 illustrates a first example of the stator frame 11.

The stator frame 9 comprises openings 39 on the lateral surface of the frame 11 so that the cooling fluid circulating in the cooling ducts 36 escapes from the stator 9 through the openings 39.

FIG. 10 illustrates a second example of the stator frame 11. The stator frame 11 comprises an opening 40 at each end of the stator frame so that the cooling fluid circulating in cooling ducts 36 escapes from the stator through the openings 40.

FIG. 11 illustrates a first example of an electrical circuit of the rotor 10.

In this example, the rotor shaft 10a comprises the first slip ring 41 and the second slip ring 42, and the rotor frame 11 comprises a first brush 43 in contact with the first slip ring 41 and the second brush 44 in contact with the second slip ring 42, the first brush 43 and the second brush 44 being respectively supplied by two different electric potentials of the converter 11.

The rotor 10 further comprises commutation means 45 connected to the slip rings 41, 42 and supplying all of the rotor coils 15 of the rotor poles P1 to P24 or a part of the rotor coils 15 to vary the rotation speed of the rotor 10.

The commutation means 45 permit to allow speed variation of the rotor 10 without modifying the frequency of the supply signals generated by the converter 11 to supply the machine 8 and without any changes in the stator coils 12.

The rotation direction of the rotor 10 is easily adjusted by modifying the control of supply signal generated by the converter 11.

Each rotor coil 15 comprise a first extremity 15a and a second extremity 15b.

The commutation means 45 may comprise five switches K1, K2, K3, K4, K5 and a control circuit 46 to control the five switches K1, K2, K3, K4, K5.

The control circuit 46 may comprise a processing unit located on the rotor 10 to communicate with the switches K1, K2, K3, K4, K5.

A first extremity of a first switch K1, a first extremity of a fifth switch K5, the first extremity 15a of the coil 15 of the poles P1, P5, P9, P13, P17, P21, and the second extremity 15b of the winding 15 of the poles P2, P4, P6, P8, P10, P12, P14, P16, P18, P20, P22, P24 are connected to the first slip ring 41.

The second extremity of the first switch K1, a first extremity of a second switch K2 and the first extremity 15a of the coil 15 of the poles P3, P7, P11, P15, P19 and P23 are connected together.

The second extremity of the second switch K2, a first extremity of a third switch K3, and the second extremity 15b of the coil 15 of the poles P1, P5, P9, P13, P17 and P21 are connected to the second slip ring 40.

The second extremity of the fifth switch K5, the second extremity of a third switch K3, a first extremity of the fourth switch K4, and the second extremity 15b of the coil 15 of the poles P3, P7, P11, P15, P19 and P23 are connected together.

The second extremity of the fourth switch K4 and the first extremity 15a of the coil 15 of the P2, P4, P6, P8, P10, P12, P14, P16, P18, P20, P22, P24 are connected together.

In the following, a closed switch is understood as a switch in which current flow through, and an open switch is understood as a switch in which no current flow through.

When the first switch K1, third switch K3 and fourth switch K4 are closed, and the second switch K2 and the fifth switch K5 are open by the control circuit 46, the poles P1 to P24 of the rotor 10 are supplied with a current delivered by the converter 11.

When the first switch K1, third switch K3 and fourth switch K4 are open, and the second switch K2 and the fifth switch K5 are closed by the control circuit 46, one on two poles is supplied by the converter 11, namely the poles P1, P3, P5, P7, P9, P11, P13, 15, P17, P19, P21 and P23 are supplied with a current delivered by the converter 11.

As the rotation speed of the rotor 10 is determined by the number of supplied poles P1 to P24, the arrangement of the poles P1 to P24 and the supply frequency of the converter 11, the commutation means allow to modify easily the rotation speed of the rotor 10 of the machine 8 without modifying the frequency of the supply signal delivered by the power converter 11 or modifying the stator coils.

The rotation direction of the rotor 10 is easily adjusted by modifying the control of supply signal generated by the converter 11.

The switching means comprising five switches K1 to K5 allow to choose the rotor speed between a first rotation speed when all the poles P1 to P24 supplied by the converter 11, and a second rotation speed when one on two poles P1 to P24 are supplied by the converter 11, the first speed being half as high as the second speed when the frequency of the supply signal is equal to a constant predetermined value.

The synchronous machine 8 comprising the concentric winding topology in the stator 9 and the wounded rotor 10 as described below allows to achieve the speed variation of the rotor 10 without modifying the supply signal generated by the converter 11 and without modifying the stator coils arrangement.

In another embodiment, the switching means are designed to choose between more than two different rotation speeds by supplying less than one pole out of two poles, for example one pole out of four poles.

FIG. 12 illustrates a second example of an electrical circuit of the rotor 10.

In this example, the rotor shaft 10A comprises the first slip ring 41, the second slip ring 42, a third slip ring 48, and the rotor frame 11 comprises the first brush 43 in contact with the first slip ring 41, the second brush 44 in contact with the second slip ring 42 a third brush 47 in contact with the third slip ring 48, the first brush 43, the second brush 44 and the third brush 47 being respectively supplied by three different electric potentials of the converter 11.

The first extremity 15a of the rotor coil 15 of the poles P1, P3, P4, P6, P8, P9, P11, P12, P14, P16, P17, P19, P20, P22, P24, and the second extremity 15b of the coil 15 of the poles P2, P5, P7, P10, P13, P15, P18, P21, P23 are connected to the first slip ring 41.

The first extremity 15a of the coil 15 of the poles P2, P5, P7, P10, P13, P15, P18, P21, P23, and the second extremity 15b of the coil 15 of the poles P1, P3, P6, P9, P11, P14, P17, P19, P22 are connected to the second slip ring 42.

The second extremity 15b of the coil 15 of the poles P4, P8, P12, P16, P20, P24 is connected to the third slip ring 48.

A first set of the rotor coils 15 of the poles P1, P2, P3, P5, P6, P7, P9, P10, P11, P13, P14, P15, P17, P18, P19, P21, P22, P23, are supplied with the first and second slip rings 41, 42, and a second set of the rotor coils 15 of the poles P4, P8, P12, P16, P20, P24 are supplied with the first and third slip rings 41, 48.

The sum of the first and second set of coils 15 is equal to the number of rotor coils 15.

The second set of rotor coils 15 form compensation poles of the rotor 10 to reduce the distortion of the magnetic flux in the air gap 16 leading to less losses, ripples, vibrations, or noise. In addition, this can also help to enhance the torque-speed capabilities of the proposed machine.

FIG. 13 illustrates another example of the synchronous electrical machine 8.

The machine 8 comprises a stator 49 lodged in a wounded rotor 50, the stator 49 and the rotor 50 having the same architecture as the stator 9 and the rotor 10.

The invention claimed is:

1. The synchronous electrical machine comprising:
a stator and a wounded rotor, the stator comprising a plurality of phases, each phase comprising a plurality of coils connected together and a plurality of magnetic stator pole cores fixed on a stator frame and evenly distributed along a stator diameter, each coil being wounded around a different magnetic stator pole core to form a magnetic stator pole, each phase comprising a same number of magnetic stator poles, the magnetic stator poles of each phase being disposed in the stator frame to form a concentric winding stator, characterized in that the rotor comprises a plurality of magnetic rotor pole cores evenly distributed around the rotor and rotor coils, each rotor coil being wounded around a different magnetic rotor pole core to form a magnetic rotor pole;
wherein each magnetic stator pole core of the plurality of magnetic stator pole cores comprises a plurality of magnetic elements, two adjacent magnetic elements of the plurality of magnetic elements being separated by an air gap being defined between a magnetic rotor pole core of the plurality of magnetic rotor pole cores and the two adjacent magnetic elements of the plurality of magnetic elements, forming a radial cooling duct.

2. The synchronous electrical machine according to claim 1, wherein the plurality of magnetic stator pole cores are fixed on the stator frame with first removable fasting means and the plurality of magnetic rotor pole cores are fixed on a rotor shaft with second removable fasting means.

3. The synchronous electrical machine according to claim 2, wherein the first removable fasting means comprise first screws passing through holes evenly disposed on a longitudinal direction of the stator frame and tapered retaining means incorporated in each magnetic stator pole core of the plurality of magnetic stator pole cores, the first screws being engaged in the tapered retaining means, and the second removable fasting means comprising second screws passing through holes evenly disposed on a longitudinal direction of the plurality of magnetic rotor pole cores, the rotor shaft comprising tapered holes in which the second screws are engaged.

4. The synchronous electrical machine according to claim 1, wherein a non-magnetic shim is interposed between each magnetic stator pad pole core and the stator frame.

5. The synchronous electrical machine according to claim 1, wherein each magnetic stator pole core extending in a longitudinal direction of the stator comprises at least one cooling groove on a surface of the said magnetic stator pole core in contact with the stator frame and extending along the longitudinal direction so that the groove and the contact surface of the stator frame form a cooling channel.

6. The synchronous electrical machine according to claim 1, wherein the stator frame comprises openings on the lateral surface of the stator frame so that a cooling fluid circulating in cooling ducts escapes from the stator through the openings.

7. The synchronous electrical machine according to claim 1, wherein the stator frame comprises an opening at each of end so that a cooling fluid circulating in cooling ducts escapes from the stator through the openings.

8. The synchronous electrical machine according to claim 5, wherein each magnetic stator pole core of the plurality of magnetic stator pole cores comprises at least one tie rod and one end plate at each end of the magnetic stator pole core, the tie rods passing through the magnetic stator pole core to connect the two end plates fixed on the stator frame.

9. The synchronous electrical machine according to claim 1, wherein the wounded rotor is lodged in the stator.

10. The synchronous electrical machine according to claim 1, wherein the stator is lodged in the rotor.

11. The synchronous electrical machine according to claim 1, wherein the rotor comprises commutation means, configured to supply all of the rotor coils or a part of the rotor coils to vary the rotation speed of the rotor when the coils of the stator are supplied with a supply signal having a constant predetermined frequency.

12. The synchronous electrical machine according to claim 11, wherein the rotor comprises a first slip ring and a second slip ring having each a different electric potential, the stator comprising two brushes, each brush cooperating with a different slip ring to supply the commutation means.

13. The synchronous electrical machine according to claim 1, wherein the rotor comprises three slips and the stator comprises three brushes, each brush cooperating with a different slip ring, each slip ring having a different electric potential, a first set of rotor coils being supplied with a first and a second slip rings, and a second set of rotor coils being supplied with the first and the third slip rings, the second set of rotor coils forming compensation poles, the sum of the first and second set of coils being equal to the number of rotor windings.

14. A boat comprising a synchronous electrical machine according to claim 1.

* * * * *